US008147692B2

(12) United States Patent
Oklejas, Jr.

(10) Patent No.: US 8,147,692 B2
(45) Date of Patent: Apr. 3, 2012

(54) BATCH-OPERATED REVERSE OSMOSIS SYSTEM WITH MULTIPLE MEMBRANES IN A PRESSURE VESSEL

(75) Inventor: Eli Oklejas, Jr., Monroe, MI (US)

(73) Assignee: Fluid Equipment Development Company, LLC, Monroe, MI (US)

( * ) Notice: Subject to any disclaimer, the term of this patent is extended or adjusted under 35 U.S.C. 154(b) by 258 days.

(21) Appl. No.: 12/342,225

(22) Filed: Dec. 23, 2008

(65) Prior Publication Data

US 2009/0173691 A1 Jul. 9, 2009

Related U.S. Application Data

(60) Provisional application No. 61/019,110, filed on Jan. 4, 2008, provisional application No. 61/024,750, filed on Jan. 30, 2008.

(51) Int. Cl.
*B01D 63/00* (2006.01)
*B01D 61/08* (2006.01)
*B01D 61/00* (2006.01)

(52) U.S. Cl. ......... 210/321.6; 210/321.72; 210/321.83; 210/321.85; 210/257.2

(58) Field of Classification Search .................. None
See application file for complete search history.

(56) References Cited

U.S. PATENT DOCUMENTS

| 659,930 A | 10/1900 | Kemble |
| 893,127 A | 7/1908 | Barber |
| 1,022,683 A | 4/1912 | Kienast |
| 1,024,111 A | 4/1912 | Anderson |
| 1,066,581 A | 7/1913 | Brown |
| 2,715,367 A | 8/1955 | Kodet et al. |
| 2,748,714 A | 6/1956 | Henry |
| 3,160,108 A | 12/1964 | Sence |
| 3,526,320 A | 9/1970 | Kryzer |

(Continued)

FOREIGN PATENT DOCUMENTS

DE 199 41 349 A1 3/2001

(Continued)

OTHER PUBLICATIONS

Ei-Sayed E et al.: "Performance evaluation of two RO membrane configurations in a MSF/RO hybrid system". Desalination, Elsevier, Amsterdam, NL, vol. 128, No. 3, May 1, 2000, pp. 231-245, XP004204830; ISSN: 0011-9164; p. 232-p. 234; figure 1.

(Continued)

*Primary Examiner* — Krishnan S Menon
(74) *Attorney, Agent, or Firm* — Harness, Dickey & Pierce, P.L.C.

(57) ABSTRACT

A reverse osmosis system and method for operating the same includes a fluid reservoir, a valve and a brine feed tank in fluid communication with the fluid reservoir through an input. The brine feed tank has brine feed fluid therein. The system also includes a high pressure pump and a pressure vessel in fluid communication with the fluid reservoir through the high pressure pump. The pressure vessel comprises a permeate outlet. The brine feed tank is in fluid communication with the pressure vessel. During a permeate production cycle, the high pressure pump pumps additional fluid under high pressure from the fluid reservoir into the pressure vessel using a high pressure pump. The pressure vessel communicates brine fluid into the brine feed tank. The high pressure pump raises a pressure in the pressure vessel until an amount of permeate is produced from a permeate output of the pressure vessel.

18 Claims, 6 Drawing Sheets

U.S. PATENT DOCUMENTS

| | | | |
|---|---|---|---|
| 3,563,618 A | 2/1971 | Ivanov | |
| 3,614,259 A | 10/1971 | Neff | |
| 3,664,758 A | 5/1972 | Sato | |
| 3,748,057 A | 7/1973 | Eskeli | |
| 3,828,610 A | 8/1974 | Swearingen | |
| 3,969,804 A | 7/1976 | Macinnes et al. | |
| 3,999,377 A | 12/1976 | Oklejas et al. | |
| 4,028,885 A | 6/1977 | Ganley et al. | |
| 4,029,431 A | 6/1977 | Bachl | |
| 4,070,280 A | 1/1978 | Bray | |
| 4,165,288 A * | 8/1979 | Teed et al. | 8/653 |
| 4,187,173 A | 2/1980 | Keefer | |
| 4,230,564 A | 10/1980 | Keefer | |
| 4,243,523 A | 1/1981 | Pelmulder | |
| 4,255,081 A | 3/1981 | Oklejas et al. | |
| 4,288,326 A | 9/1981 | Keefer | |
| 4,353,874 A | 10/1982 | Keller et al. | |
| 4,354,939 A | 10/1982 | Pohl | |
| 4,432,876 A | 2/1984 | Keefer | |
| 4,434,056 A | 2/1984 | Keefer | |
| 4,472,107 A | 9/1984 | Chang et al. | |
| RE32,144 E | 5/1986 | Keefer | |
| 4,632,756 A | 12/1986 | Coplan et al. | |
| 4,702,842 A | 10/1987 | Lapierre | |
| 4,814,086 A * | 3/1989 | Bratt | 210/636 |
| 4,830,572 A | 5/1989 | Oklejas, Jr. et al. | |
| 4,921,603 A | 5/1990 | Yen | |
| 4,966,708 A | 10/1990 | Oklejas et al. | |
| 4,973,408 A | 11/1990 | Keefer | |
| 4,983,301 A * | 1/1991 | Szucz et al. | 210/636 |
| 4,983,305 A | 1/1991 | Oklejas et al. | |
| 4,997,357 A | 3/1991 | Eirich et al. | |
| 5,020,969 A | 6/1991 | Mase et al. | |
| 5,043,071 A | 8/1991 | Anselme et al. | |
| 5,049,045 A | 9/1991 | Oklejas et al. | |
| 5,082,428 A | 1/1992 | Oklejas et al. | |
| 5,106,262 A | 4/1992 | Oklejas et al. | |
| 5,132,015 A | 7/1992 | Down | |
| 5,132,090 A | 7/1992 | Volland | |
| 5,133,639 A | 7/1992 | Gay et al. | |
| 5,154,572 A | 10/1992 | Toyoshima et al. | |
| 5,320,755 A | 6/1994 | Hagqvist et al. | |
| 5,338,151 A | 8/1994 | Kemmner et al. | |
| 5,340,286 A | 8/1994 | Kanigowski | |
| 5,401,395 A | 3/1995 | Hagqvist et al. | |
| 5,482,441 A | 1/1996 | Permar | |
| 5,499,900 A | 3/1996 | Khmara et al. | |
| 5,647,973 A | 7/1997 | Desaulniers | |
| 5,702,229 A | 12/1997 | Moss et al. | |
| 5,819,524 A | 10/1998 | Bosley et al. | |
| 5,951,169 A | 9/1999 | Oklejas et al. | |
| 5,980,114 A | 11/1999 | Oklejas, Jr. | |
| 6,007,723 A | 12/1999 | Ikada et al. | |
| 6,017,200 A | 1/2000 | Childs et al. | |
| 6,036,435 A | 3/2000 | Oklejas | |
| 6,110,360 A | 8/2000 | Hart, Jr. | |
| 6,110,375 A | 8/2000 | Bacchus et al. | |
| 6,116,851 A | 9/2000 | Oklejas, Jr. | |
| 6,120,689 A | 9/2000 | Tonelli et al. | |
| 6,139,740 A | 10/2000 | Oklejas | |
| 6,139,750 A | 10/2000 | Graham | |
| 6,187,200 B1 | 2/2001 | Yamamura et al. | |
| 6,190,556 B1 | 2/2001 | Uhlinger | |
| 6,299,766 B1 | 10/2001 | Permar | |
| 6,309,174 B1 | 10/2001 | Oklejas, Jr. et al. | |
| 6,345,961 B1 | 2/2002 | Oklejas, Jr. | |
| 6,375,842 B1 | 4/2002 | Graham | |
| 6,402,956 B1 | 6/2002 | Andou et al. | |
| 6,468,431 B1 | 10/2002 | Oklelas, Jr. | |
| 6,508,937 B1 | 1/2003 | Kawashima et al. | |
| 6,589,423 B1 | 7/2003 | Chancellor | |
| 6,613,233 B1 | 9/2003 | Rusk et al. | |
| 6,709,599 B1 | 3/2004 | Rosenberger et al. | |
| 6,713,028 B1 | 3/2004 | Oklejas, Jr. | |
| 6,797,173 B1 | 9/2004 | Oklejas, Jr. | |
| 6,881,336 B2 | 4/2005 | Johnson | |
| 6,908,546 B2 | 6/2005 | Smith | |
| 6,932,907 B2 | 8/2005 | Haq et al. | |
| 6,936,140 B2 | 8/2005 | Paxton et al. | |
| 6,942,797 B1 * | 9/2005 | Chancellor et al. | 210/321.64 |
| 7,077,962 B2 | 7/2006 | Pipes | |
| 7,150,830 B1 | 12/2006 | Katsube et al. | |
| 2003/0080058 A1 | 5/2003 | Kimura et al. | |
| 2004/0104157 A1 | 6/2004 | Beeman et al. | |
| 2004/0211729 A1 | 10/2004 | Sunkara et al. | |
| 2006/0157409 A1 | 7/2006 | Hassan | |
| 2006/0157410 A1 | 7/2006 | Hassan | |
| 2006/0226077 A1 | 10/2006 | Stark | |
| 2006/0254981 A1 | 11/2006 | Efraty | |
| 2007/0023347 A1 | 2/2007 | Chabot | |
| 2007/0056907 A1 | 3/2007 | Gordon | |
| 2007/0181497 A1 | 8/2007 | Liberman | |
| 2007/0199878 A1 | 8/2007 | Eisberg et al. | |
| 2007/0289904 A1 | 12/2007 | Oklejas | |
| 2007/0295650 A1 | 12/2007 | Yoneda et al. | |
| 2008/0023410 A1 | 1/2008 | Efraty | |
| 2008/0217222 A1 | 9/2008 | Efraty | |

FOREIGN PATENT DOCUMENTS

| | | | |
|---|---|---|---|
| EP | 1508361 A | | 2/2005 |
| GB | 2363741 A | | 1/2002 |
| GB | 2 377 928 A | | 1/2003 |
| WO | WO02/09855 A | | 2/2002 |
| WO | WO2005/075061 A1 | | 8/2005 |
| WO | WO2006/106158 A | | 10/2006 |
| WO | WO 2007/096679 | | 8/2007 |
| WO | WO2007/146321 A | | 12/2007 |

OTHER PUBLICATIONS

Geisler P et al.: "Reduction of the energy demand for seawater RO with the pressure exchange system PES". Desalination, Elsevier, Amsterdam, NL, vol. 135, No. 1-3, Apr. 20, 2001, pp. 205-210, XP004249642; ISSN: 0011-9164; the whole document.

Letter dated Aug. 11, 2011 to Ella Cheong Spruson & Ferguson from IPO of Singapore.

Letter dated Nov. 23, 2011 from Ella Cheong to Kevin G. Mierzwa at Harness, Dickey & Pierce, P.L.C.

Search Report from Hungarian Intellectual Property Office transmitted to Singapore Intellectual Property Office mailed Oct. 27, 2011.

\* cited by examiner

BATCH-OPERATED REVERSE OSMOSIS SYSTEM WITH MULTIPLE MEMBRANES IN A PRESSURE VESSEL

RELATED APPLICATION

This application is a non-provisional application of provisional application 61/019,110, filed Jan. 4, 2008 and provisional application 61/024,750, filed Jan. 30, 2008, the disclosures of which are incorporated by reference herein.

TECHNICAL FIELD

The present disclosure relates generally to reverse osmosis systems, and, more specifically, to batch-operated reverse osmosis systems.

BACKGROUND

The statements in this section merely provide background information related to the present disclosure and may not constitute prior art.

Reverse osmosis systems are used to provide fresh water from brackish or sea water. A membrane is used that restricts the flow of dissolved solids therethrough.

A reverse osmosis system involves pressurizing a solution with an applied pressure greater than an osmotic pressure created by the dissolve salts within the solution. The osmotic pressure is generally proportional to the concentration level of the salt. The approximate osmotic pressure in pounds-per-square-inch is the ratio of the salt mass to water mass times 14,000. A one-percent solution of salt would have an osmotic pressure of about 140 psi. Ocean water typically has a 3.5 percent concentration and an osmotic pressure of 490 psi.

Water extracted from a reverse osmosis system is called permeate. As a given body of saline solution is processed by the reverse osmosis membrane, the concentration of the solution is increased. At some point, it is no longer practical to recover permeate from the solution. The rejected material is called brine or the reject. Typically, about 50% of recovery of permeate from the original volume of sea water solution reaches the practical limit.

Figure 1:
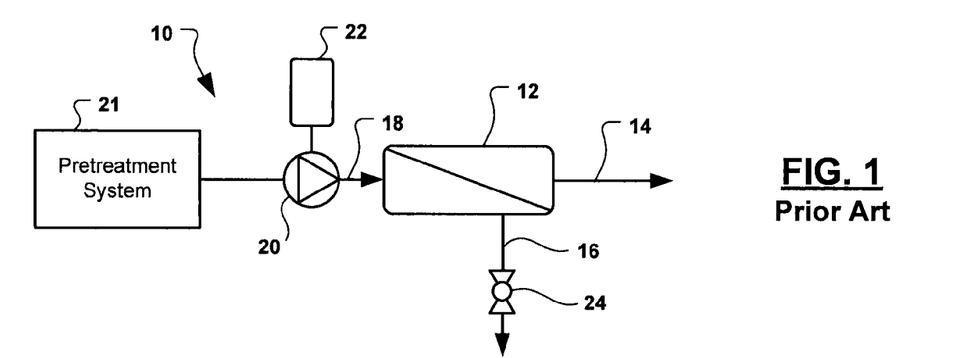
FIG. 1 is a schematic view of a prior reverse osmosis system.

Referring now to FIG. 1, a reverse osmosis system 10 is illustrated having a membrane array 12 that generates a permeate stream 14 and a brine stream 16 from a feed stream 18. The feed stream 18 typically includes brackish or sea water. A feed pump 20 coupled to a motor 22 pressurizes the feed stream 18 to the required pressure flow which enters the membrane array 12.

The permeate stream 14 is purified fluid flow at a low pressure. The brine stream 16 is a higher pressure stream that contains dissolved materials blocked by the membrane. The pressure of the brine stream 16 is only slightly lower than the feed stream 18. The membrane array 12 requires an exact flow rate for optimal operation. A brine throttle valve 24 may be used to regulate the flow through the membrane array 12. Changes take place due to water temperature, salinity, as well as membrane characteristics, such as fowling. The membrane array 12 may also be operated at off-design conditions on an emergency basis. The feed pumping system is required to meet variable flow and pressure requirements.

In general, a higher feed pressure increases permeate production and, conversely, a reduced feed pressure reduces permeate production. The membrane array 12 is required to maintain a specific recovery which is the ratio of the permeate flow to feed flow. The feed flow or brine flow likewise requires regulation.

A pretreatment system 21 may also be provided to pre-treat the fluid into the membrane array 12. The pretreatment system 21 may be used to remove solid materials such as sand, grit and suspended materials. Each of the embodiments below including those in the detailed disclosure may include a pretreatment system 21.

Figure 2:
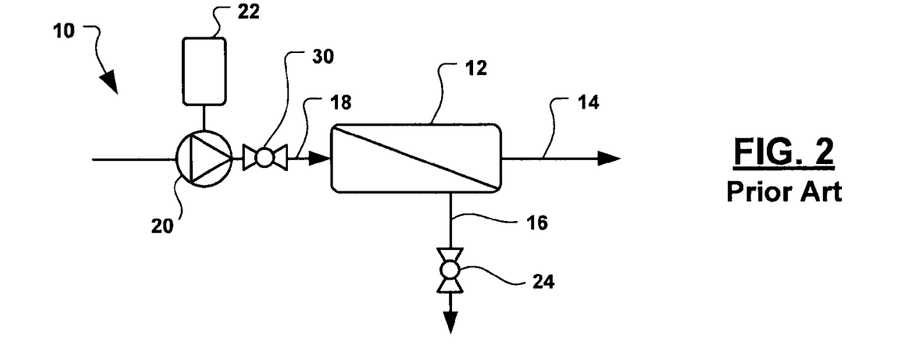
FIG. 2 is a schematic view of an alternate prior art reverse osmosis system.

Referring now to FIG. 2, a system similar to that in FIG. 1 is illustrated with the addition of a feed throttle valve 30. Medium and large reverse osmosis plants typically include centrifugal-type pumps 20. The pumps have a relatively low cost and good efficiency, but they may generate a fixed pressure differential at a given flow rate and speed of rotation. To change the pressure/flow characteristic, the rate of pump rotation must be changed. One way prior systems were designed was to size the feed pump 20 to generate the highest possible membrane pressure and then use the throttle valve 30 to reduce the excess pressure to meet the membrane pressure requirement. Such a system has a low capital cost advantage but sacrifices energy efficiency since the feed pump generates more pressure and uses more power than is required for a typical operation.

Figure 3:
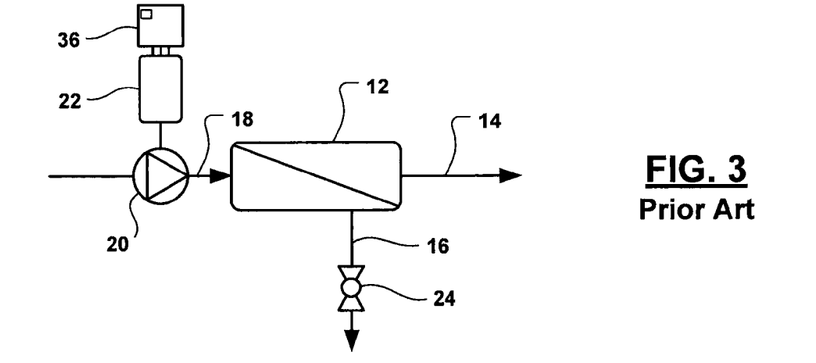
FIG. 3 is a schematic view of another prior art of a reverse osmosis system.

Referring now to FIG. 3, another system for solving the pressure/flow characteristics is to add a variable frequency drive 36 to operate the motor 22 which, in turn, controls the operation of the feed pump 20. Thus, the feed pump 20 is operated at variable speed to match the membrane pressure requirement. The variable frequency drives 36 are expensive with large capacities and consume about three percent of the power that would otherwise have gone to the pump motor.

Figure 4:
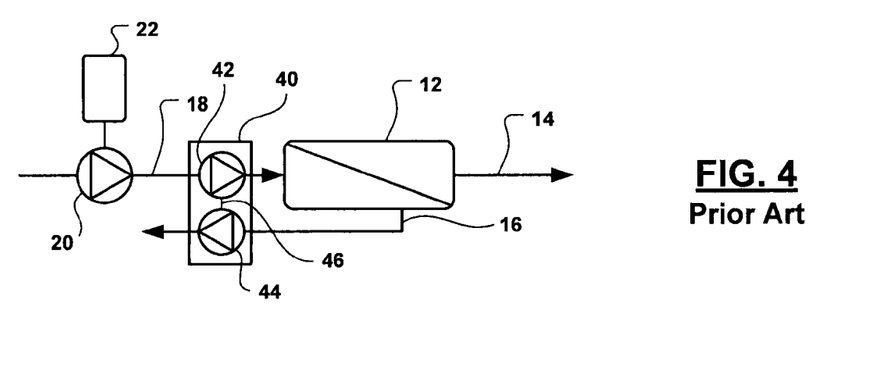
FIG. 4 is another schematic view of a prior art configuration of a reverse osmosis system.

Referring now to FIG. 4, a system similar to that illustrated in FIG. 1 is illustrated using the same reference numerals. In this embodiment, a hydraulic pressure booster 40 having a pump portion 42 and a turbine portion 44 is used to recover energy from the brine stream 16. The pump portion 42 and the turbine portion 44 are coupled together with a common shaft 46. High pressure from the brine stream passes through the turbine portion 44 which causes the shaft 46 to rotate and drive the pump portion 42. The pump portion 42 raises the feed pressure in the feed stream 18. This increases the energy efficiency of the system. The booster 40 generates a portion of the feed pressure requirement for the membrane array 12 and, thus, the feed pump 20 and motor 22 may be reduced in size since a reduced amount of pressure is required by them.

Figure 5:
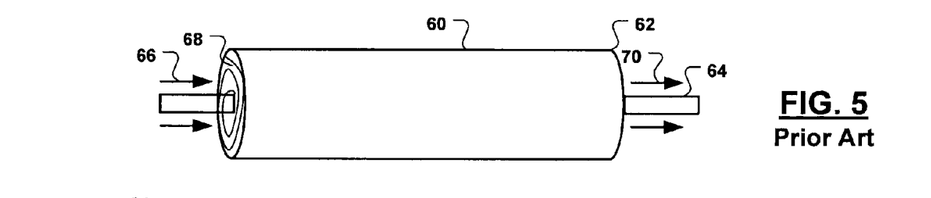
FIG. 5 is a perspective view of a prior art membrane elements according to the prior art.

Referring now to FIG. 5, a membrane element 60 that is suitable for positioning within a membrane array 12 of one of the previous Figs. is illustrated. The element 60 includes leaves of membrane material wrapped into a spiral configuration and placed in a thin tube 62 of material such as fiberglass. Each membrane leaf includes two membrane sheets glued on three sides with the fourth side attached to a central permeate pipe 64. Spacer grids (not shown) keep the membrane sheet from collapsing under the applied pressure. Feed solution enters one end of the membrane array 60 in the direction indicated by arrows 66. The solution or feed flows axially along the membrane element 60 and between the leaves 68 and exits through the high pressure brine outlet as indicated by arrows 70. Permeate is collected from the leaves 68 through permeate pipe 64. The pressure of the permeate through the tube 64 is essentially zero since the applied pressure is used to overcome the osmotic pressure and frictional losses of the flow of feed material through the membrane is performed.

Figure 6:
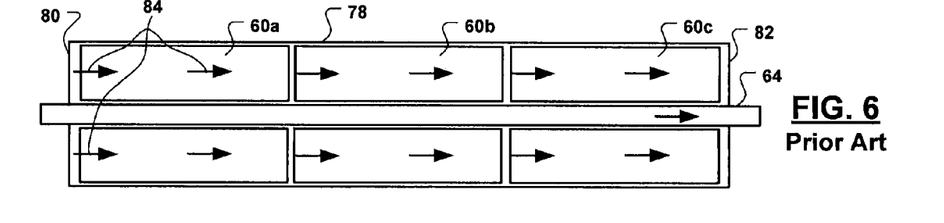
FIG. 6 is a cross-sectional view of a pressure vessel having a plurality of membrane elements such as those illustrated in FIG. 4 according to the prior art.

Referring now to FIG. 6, a pressure vessel 78 that includes a plurality of membrane elements referred to collectively with reference numeral 60 is illustrated. In this example, three membrane elements are disposed within the pressure vessel 78. Each is denoted by a numerical and alphabetical identifier.

In this example, three membrane elements 60*a*, 60*b* and 60*c* are provided in the pressure vessel 78. The pressure vessel 78 includes a first end cap 80 at the input end and a second end cap 82 at the outlet end. Feed is introduced into the pressure vessel in the direction of the arrows 84.

In this example, the three membrane elements 60*a*-60*c* are placed in series. Each subsequent element extracts a smaller amount of permeate than the preceding element due to an increasing osmotic pressure and decreasing applied pressure caused by frictional losses within the membrane elements. As a consequence, the final element 60*c* may produce very little permeate. The permeate pipe 64 collects permeate from each of the membrane elements 60*a*-60*c*.

A typical reverse osmosis system operates at a constant pressure that is developed at the feed pump 20. The result is that an excess of applied pressure at the first membrane array may result in an undesirably high rate of permeate extraction which may allow the membranes to be damaged. The final membrane element 60*c* may have an undesirably low rate of extraction which may result in permeate with an excessive amount of salt contamination.

SUMMARY

The present disclosure provides a reverse osmosis system that reduces pumping energy but allows a sufficient pressure to be generated at each of the membrane elements.

In one aspect of the disclosure, a method of operating a reverse osmosis system includes filling a brine feed tank with low pressure fluid from a fluid reservoir through an input, communicating brine feed tank fluid to a pressure vessel during permeate production, pumping additional fluid under high pressure from the fluid reservoir into the pressure vessel using a high pressure pump, pumping brine fluid from the pressure vessel to the brine feed tank during permeate production and raising a pressure in the pressure vessel using the high pressure pump until an amount of permeate is produced from a permeate output of the pressure vessel.

In another aspect of the disclosure, a reverse osmosis system includes a fluid reservoir, a valve and a brine feed tank in fluid communication with the fluid reservoir through an input. The brine feed tank has brine feed fluid therein. The system also includes a high pressure pump and a pressure vessel in fluid communication with the fluid reservoir through the high pressure pump. The pressure vessel comprises a permeate outlet. The brine feed tank is in fluid communication with the pressure vessel. During a permeate production cycle, the high pressure pump pumps additional fluid under high pressure from the fluid reservoir into the pressure vessel using a high pressure pump, said pressure vessel communicating brine fluid into the brine feed tank. The high pressure pump raises a pressure in the pressure vessel until an amount of permeate is produced from a permeate output of the pressure vessel.

In a further aspect of the disclosure, a method of operating a reverse osmosis system includes filling a first brine feed tank with low pressure fluid from a fluid reservoir through a first input. The method includes performing a first permeate production cycle by communicating first brine feed tank fluid to a pressure vessel, pumping additional fluid under high pressure from the fluid reservoir into the input of the pressure vessel using a high pressure pump, pumping brine fluid from the pressure vessel to the first brine feed tank, raising a pressure in the pressure vessel using the high pressure pump until a first amount of permeate is produced from a permeate output of the pressure vessel, filling a second brine feed tank with low pressure fluid from a fluid reservoir through an input and terminating the first permeate production cycle. The method also includes performing a second permeate production cycle after the first permeate production cycle by communicating second brine feed tank fluid to the pressure vessel, pumping additional fluid under high pressure from fluid reservoir into the input of the pressure vessel using the high pressure pump, pumping brine fluid from the pressure vessel to the second brine feed tank and raising a pressure in the pressure vessel using the high pressure pump until a first amount of permeate is produced from a permeate output of the pressure vessel.

In yet another aspect of the disclosure, a reverse osmosis system includes a fluid reservoir, a first input valve, a second input valve, a first brine feed tank in fluid communication with the fluid reservoir through the first input valve and a second brine feed tank in fluid communication with the fluid reservoir through the second input valve. The first brine feed tank and the second brine feed tank having brine feed fluid therein. The system further includes a high pressure pump and a pressure vessel in fluid communication with the fluid reservoir through the high pressure pump. The pressure vessel includes a permeate outlet. The first brine feed tank and the second brine feed tank is in fluid communication with the pressure vessel. During a first permeate production cycle, the first brine tank provides brine fluid to the pressure vessel and the high pressure pump pumps additional fluid under high pressure from the fluid reservoir into the pressure vessel using a high pressure pump. The high pressure pump raises a pressure in the pressure vessel until a first amount of permeate is produced from a permeate output of the pressure vessel. During a second permeate production cycle, the second brine tank provides brine fluid to the pressure vessel and the high pressure pump pumps additional fluid under high pressure from the fluid reservoir into the pressure vessel using the high pressure pump. The high pressure pump raises a pressure in the pressure vessel until a second amount of permeate is produced from the permeate output of the pressure vessel.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

In the following disclosure, a batch process in which applied pressure is varied as needed to maintain permeate production at a desired rate as the osmotic pressure increases is set forth. Various parameters and operating conditions may vary depending on various characteristics including the type of membrane. As mentioned above, operation of the system at a pressure that does not waste energy by being too high or that is too low for good quality permeate is desired.

Figure 7:
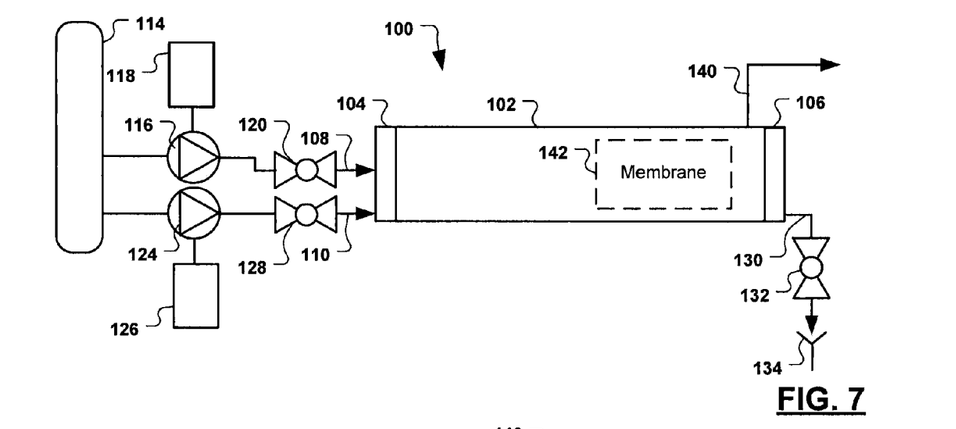
FIG. 7 is a schematic view of a batch process reverse osmosis system.

Referring now to FIG. 7, a batch-operated reverse osmosis system is set forth having a pressure vessel 102. The pressure vessel has end caps 104 at the input end and an end cap 106 at the output end. The input end has a high-pressure input 108 and a low-pressure input 110. The high-pressure input 108 and the low-pressure input 110 may be formed from pipes. The pipes may enter through the end cap or in the sidewall of the pressure vessel 102. Ultimately, both the high-pressure input 108 and the low-pressure input 110 are in communication with a fluid reservoir 114. The fluid reservoir 114 may be a sea-water reservoir that is used to store filtered sea water. A fluid path from the reservoir 114 to the high-pressure input 108 may include a high-pressure pump 116 driven by a motor 118 and a valve 120 that allows the fluid path to the high-pressure input 108 to be closed or open. One example of a suitable pump 116 is a positive displacement-type pump.

A second fluid path from the fluid reservoir 114 may include a low-pressure pump 124 that is driven by a motor 126. The fluid path may also include a valve 128. In the high-pressure fluid path, the valve 120 may be located between the pump 116 and the high-pressure input 108. In the low-pressure fluid path, the valve 128 may be located between the pump 124 and the low-pressure input 110.

At the output end of the pressure vessel 102, a brine output 130 may be disposed in the end cap 106 or the outer wall of the pressure vessel 102. A brine drain valve 132 may be coupled adjacent to and within the brine flow path. The output of the brine drain valve 132 is in fluid communication with a drain 134.

The output end of the pressure vessel 102 also includes a permeate output 140 that is used to remove permeate created by the membrane 142 within the pressure vessel 102. Both the permeate output and the brine output may include pipes.

The membrane 142 may be positioned within the pressure vessel 102 proximate to the second end or the output end of the pressure vessel opposite the input end. As is illustrated, the membrane 142 is positioned near or proximate to the permeate output 140 and the brine output 130.

In operation, the pressure vessel 102 is filled with fluid from the reservoir 114. In this embodiment, sea water is used. The low-pressure pump 124 is used to provide the sea water from the reservoir 114 through control valve 128 which is open. The high-pressure valve 120 is closed and the brine drain valve 132 is open to allow air or brine from the previous cycle to escape from the pressure vessel 102. When the pressure vessel 102 is filled with sea water, the low-pressure valve 128 is closed. Operation of the high-pressure pump 116 is started and the high-pressure valve 120 is opened. Also, the brine drain valve 132 is closed. The pressure within the pressure vessel 102 rapidly increases until the pressure exceeds the osmotic pressure which causes the membrane 142 to produce permeate which exits through the permeate output 140 of the pressure vessel 102.

The feed pump 116 continues to pump more sea water from the fluid reservoir 114 through the high-pressure valve 120 and into the pressure vessel 102 through the high-pressure fluid input 108. The continual addition of sea water and pressure makes up for the permeate removed through the permeate output 140 and to overcome the increasing osmotic pressure due to the increasing concentration of the brine within the pressure vessel 102.

One example of suitable pressures includes an initial pressure to produce permeate of about 500 psi during the permeate production cycle. As the permeate production increases, the pressure is increased to maintain the permeate production. If a fifty-percent total recovery is desired, the final pressure may be about 1000 psi. Thus, the average pressure is about 750 psi. Prior known systems that use conventional flow RO processing require a constant 1000 psi. Thus, the feed pump pressure requirement has been reduced by 25%.

Figure 8:
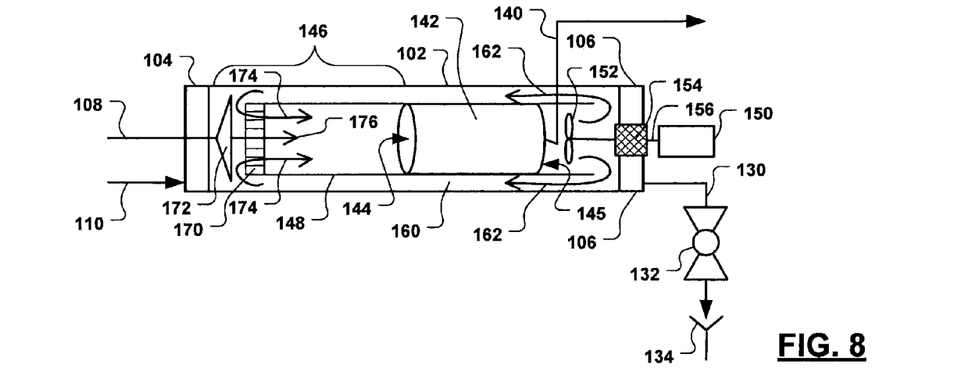
FIG. 8 is a cross-sectional view of the pressure vessel of FIG. 6.

Referring now to FIG. 8, a cross-sectional view of a pressure vessel 102 is illustrated in further detail. The membrane 142 is located at the opposite end of the elongated pressure vessel from the high-pressure input 108 and the low-pressure input 110. The membrane 142 includes a first membrane face 144 and a second membrane face. A volume 146 between the end cap 104 and the first membrane face 144 may be at least equal to the volume of the membrane 102 so that a reasonable amount of feed water or sea water can be processed in one batch cycle. The membrane 144 is disposed within a tube 148. The second face 145 is disposed toward the output end of the pressure vessel 102. One end of the tube 148 is positioned proximate to the output end of the pressure vessel. The tube 148 extends past the second face 145 of the membrane 142.

The permeate output 140 extends out of the sidewall of the pressure vessel 102. The permeate output 140 receives permeate through the membrane 144.

A motor 150 is used to drive an impeller 152 that is disposed within, near or proximate the tube 148 adjacent to or proximate the second face 145 of the membrane 142. Of course, different positions of the impeller 152 outside of the tube 148 are possible. A high pressure seal 154 is used to seal a shaft 156 extending between the motor 150 and the impeller 152. Of course, a magnetic drive may be used between the motor 150 and the impeller 152 so that the seal may be eliminated.

The motor 150 drives the impeller 152 to circulate brine fluid from the membrane 142 between an annular passage 160 between the tube 148 and the outer wall of the pressure vessel 102. The direction of flow of the brine fluid pushed by the impeller 152 is from the second end of the pressure vessel or output end of the pressure vessel 102 toward the first end or input end of the pressure vessel 14, as indicated by the arrows 162. The brine fluid enters the tube 14 through a distributor plate 170. A distributor plate is used to distribute the brine evenly across the face of the flow tube 148 and allow the flow to have a minimum turbulence. A flow diffuser 172 diffuses the high-pressure input fluid from the high-pressure input 108 evenly across the face of the flow distributor plate 170.

Choosing the proper circulation rate of brine from the impeller 152 through the annual passage and back into the tube 148 is important for the operation of the system. If the rate is too low, the axial velocity along the membrane 142 may be insufficient to prevent excessive concentration of salt along the membrane surface resulting in excessive polarization which adversely affects the permeate quality, membrane productivity and fouling resistance. By controlling the speed of the motor 150, a rate of brine circulation is controlled to permit fine tuning of the circulation rate. Rates used depend on various design considerations of the system.

A stratification of concentration in the flow tube 148 is desired. A water column within the flow tube 148 will develop a concentration gradient with the lowest concentration at the membrane face 144 and increase toward the distributor plate 170. The average concentration increases with time but the lowest concentration is present at the face of the membrane closest to the input. The distributor plate 170 and the flow diffuser 172 reduce mixing between newer, more concentrated brine and less concentrated older brine.

The flow of older, more concentrated brine products by the membrane is indicated by arrows 174 and the new sea water flow direction is indicated by arrow 176.

Figure 9:
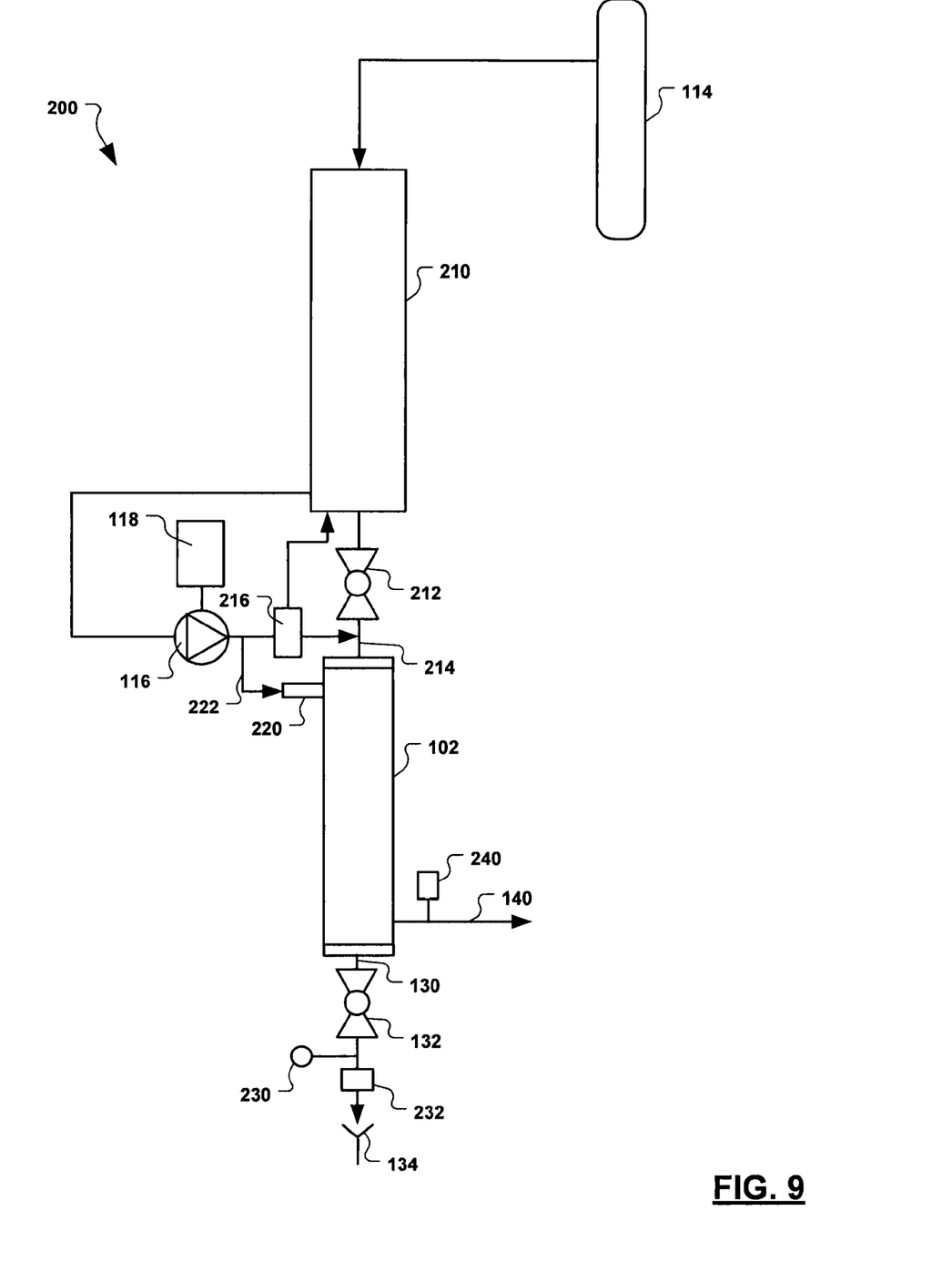
FIG. 9 is a schematic view of a second embodiment of a batch process reverse osmosis system.

Referring now to FIG. 9, a reverse osmosis system 200 having many similar components to those described above in FIGS. 7 and 8 is illustrated. Similar components will thus be given the same reference numeral and not described further. FIG. 9 includes a pressure vessel 102 that may be configured in a similar manner to that described above in FIG. 8. Thus, the internal structure and the motor 150 are thus not illustrated. In this embodiment, the fluid from the reservoir 114 may flow into a charge reservoir 210. The charge reservoir 210 may be located above (relative to the earth) the pressure vessel 102. In one constructed embodiment, the charge reservoir 210 is located directly vertically above the pressure vessel 102. This allows the use of gravity to fill the pressure vessel 102 from the charge reservoir 210. A valve 212 disposed between the charge reservoir 210 and the pressure vessel 102 is provided.

A high pressure is developed at the high-pressure pump 116 which is driven by motor 118. In this embodiment, a low pressure pump is eliminated since low pressure filling of the pressure vessel 102 is provided through the valve 212 due to gravity. After filling of the pressure vessel 102 at low pressure, high-pressure fluid from the charge reservoir 210 is created at the pump 116 and provided to the fluid input 214. The valve 212 is closed after filling and the high-pressure fluid is provided through the input 214. A diverter valve 216 is opened to allow high-pressure fluid to flow into the pressure vessel 102. The diverter valve 216 is also in fluid communication with the charge reservoir 210 when opened. A buffer pipe 220 that has a large diameter for a short length acts as a reservoir of feed water for the pressure relief process as will be described below. The large diameter buffer pipe 220 allows fluid to flow back toward the diverter valve 216 into the charge reservoir 210 as will be further described below.

After a final concentration of solution is achieved in the pressure vessel 102, the pump 116 may be turned off to prevent high-pressure fluid from continuing to flow into the pressure vessel 102. In the alternative, the diverter valve 216 may open and allow the high-pressure fluid to return back to the charge reservoir 210.

Because water is slightly compressible, pressure may be vented prior to starting the charge cycle. Pipe 222 provides a flow path to allow high pressure in the pressure vessel 102 to be vented through the diverter valve 216 toward the charge reservoir 210. The amount of fluid to be bled back to the charge reservoir 210 is preferably small since it is highly concentrated brine. The buffer pipe 220 acts as a reservoir for the pressure relief process. Therefore, little or no concentrated brine fluid may actually enter the charge reservoir 210. After the pressure has been relieved from the pressure vessel 102, the valve 212 and brine valve drain valve 132 may be opened. Concentrated brine is thus allowed to drain out of the pressure vessel 102. Sea water under low pressure is thus used to fill the pressure vessel by gravity. A flow distributor plate 170 illustrated in FIG. 8 may be used to ensure the water pushes the brine out with a minimum of mixing. A concentration meter or timer 230 may allow a determination of whether pure sea water is flowing through the brine drain pipe 130. A flow meter 232 may be used to measure the amount of fluid discharged through the pipe, since a known amount of fluid is within the pressure vessel 102.

A small reservoir 240 is positioned on the permeate pipe 140. The volume of the small reservoir is substantially less than the volume of the pressure vessel 102. After filling of the pressure vessel 102, valves 212 and 132 are closed and the diverter valve 216 diverts high-pressure fluid into the pressure vessel 102 to initiate another permeate production cycle. The small reservoir 240 allows for storage of a small amount of permeate to prevent permeate flow reversal. During a time period between the depressurization of the pressure vessel 102 and ending with the repressurization, osmotic pressure may draw permeate into the membrane 100 illustrated in FIGS. 7 and 8. By providing the small reservoir, enough permeate may be provided to accommodate the brief permeate flow reversal. The size relative to the pressure vessel may be easily determined experimentally.

Figure 10:
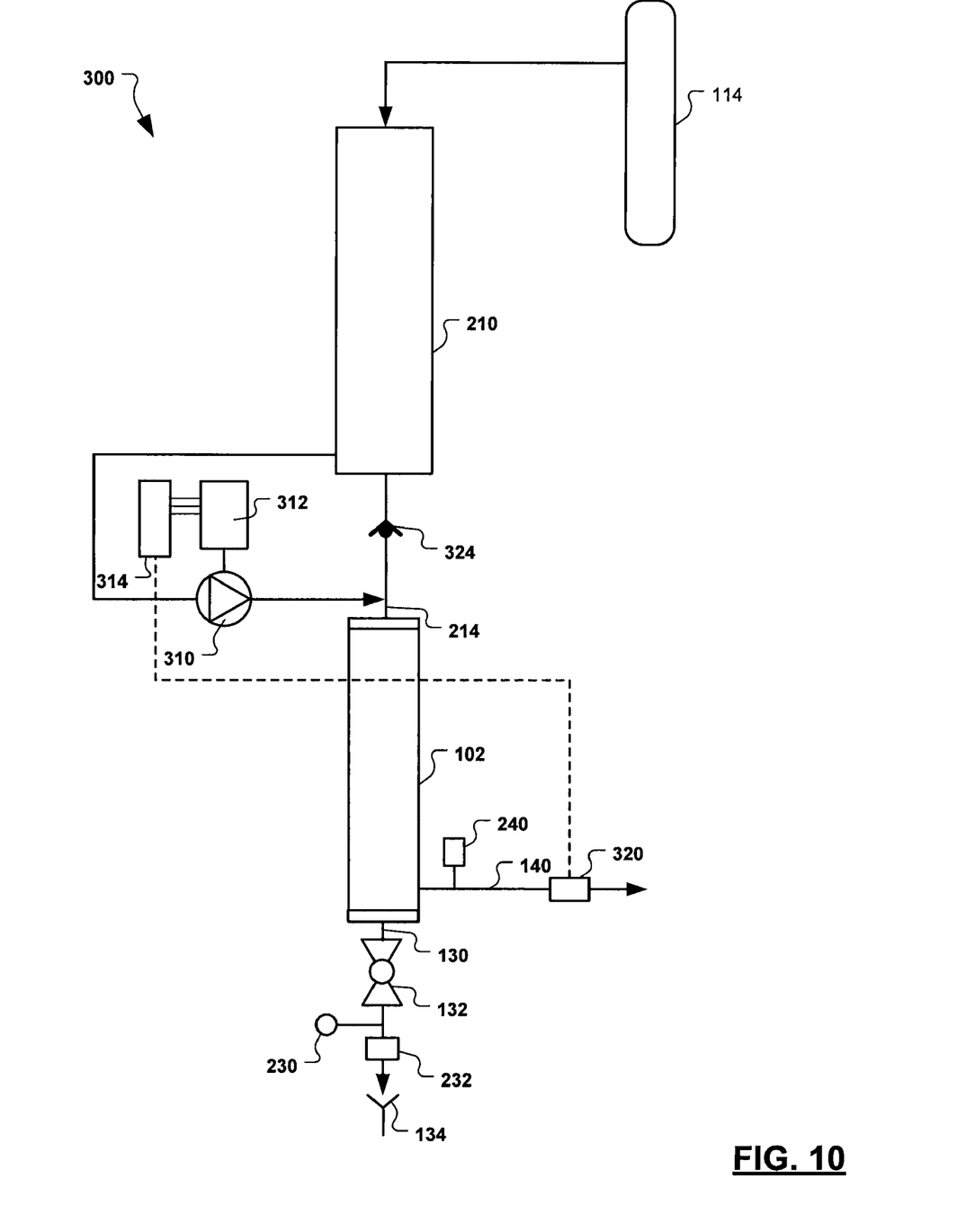
FIG. 10 is a schematic view of a third embodiment of a batch process according to the present disclosure.

Referring now to FIG. 10, an embodiment of a reverse osmosis system 300 similar to that illustrated above in FIG. 9 is illustrated and thus will have the same reference numerals. A positive displacement pump, as illustrated in FIG. 9, may not have enough capacity for a large reverse osmosis process. Thus, the positive displacement pump 116 of FIG. 9 may be replaced with a centrifugal pump 310. The centrifugal pump 310 may be driven by a motor 312 which in turn is controlled by a variable frequency drive 314. The variable frequency drive 314 may change the pump speed gradually to increase the pressure as needed to achieve the desired permeate production based on the flow rate signal from a flow meter 320 within the permeate output 140. Thus, the flow meter 132 provides a signal corresponding to the flow or amount of permeate within the permeate pipe 140.

This embodiment includes a check valve 324 that replaces valve 212 of FIG. 9. The check valve 324 opens when a lower pressure is provided at the input 214 to the pressure vessel 102. That is, when the pressure vessel 102 is at a lower pressure than the charge reservoir 210, the check valve 324 opens. When the input 214 is pressurized by fluid at high pressure from the pump 310, the check valve 324 is closed.

The permeate production cycle thus allows low-pressure fluid to fill the pressure vessel 102 when the pressure vessel is at a low pressure due to the opening of the valve 132. High pressure is generated with the pump 310 and permeate is produced as described above.

The recharge cycle is initiated by a signal from the flow meter 320 that indicates that a desired amount of permeate has been produced and the permeate production cycle may be terminated. The speed of the pump 310 is reduced to zero, which allows the check valve 324 to open since the charge reservoir 210 is at a higher pressure. Gravity may be used to provide low-pressure sea water into the pressure vessel until the brine has been fully flushed as described above using the timer or concentration meter 230 and/or the flow meter 232.

When the pressure vessel has been flushed, the valve 132 is closed and the variable frequency drive 314 causes the pump 310 to increase speed to raise the pressure in the input pipe 214 which allows the check valve 324 to close. The speed of the pump and pressure generated thereby continue to increase and thus the permeate production cycle again is completed.

Figure 11:
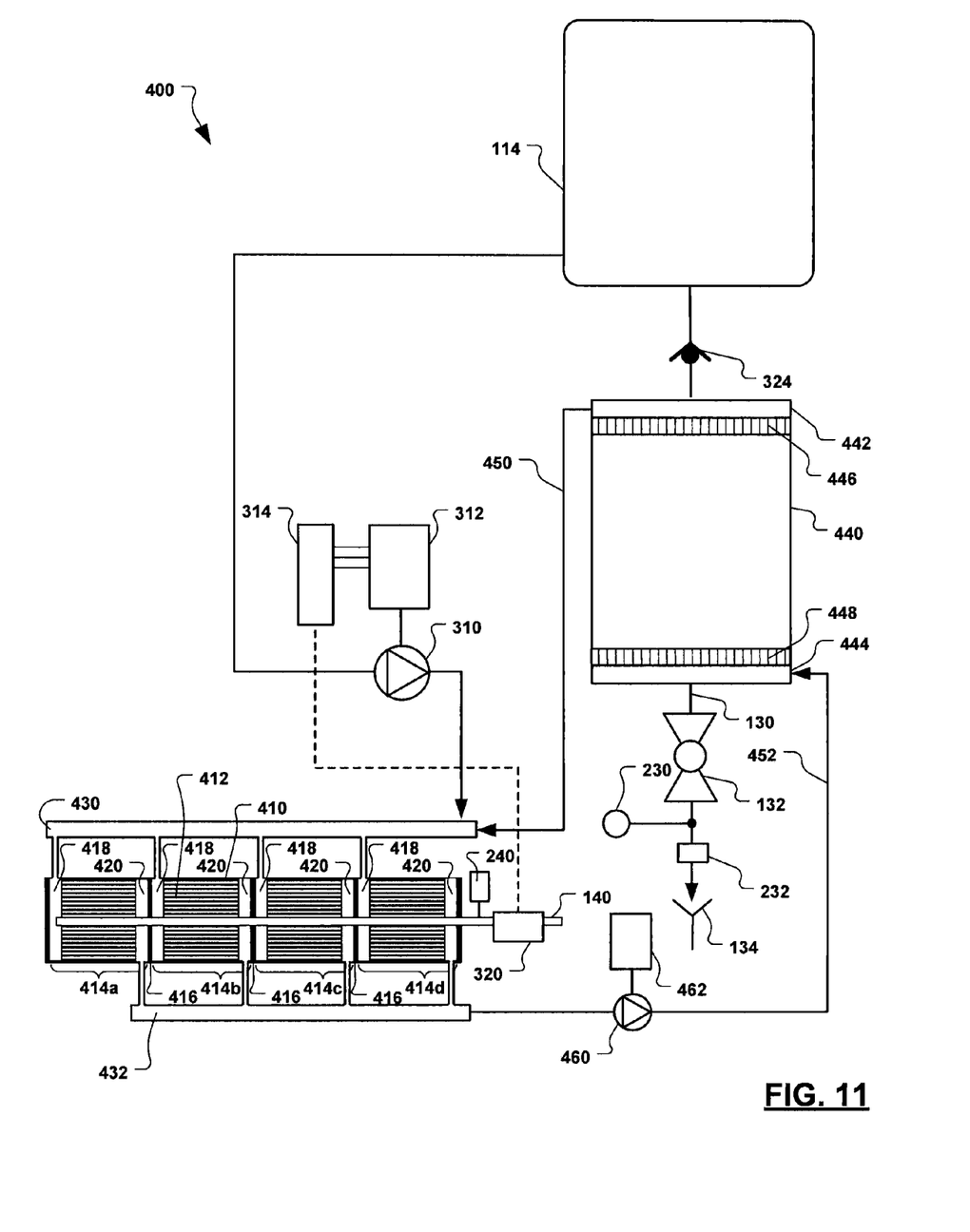
FIG. 11 is a schematic view of a fourth embodiment of the reverse osmosis system.

Referring now to FIG. 11, a high capacity reverse batch-operated reverse osmosis system 400 is set forth. In this embodiment, elements similar to those in FIG. 10 are provided with the same reference numerals. In this embodiment, a plurality of membrane elements 412 may be disposed within an enlarged pressure vessel 410. In this embodiment, the membrane elements 412 may be disposed tightly within the pressure vessel 410 and against the outer wall of the pressure vessel 410. The pressure vessel 410 may include multiple membrane elements. As illustrated, this embodiment includes four sub-chambers 414a, 414b, 414c and 414d as shown. A partitions 416 may be used to divide the pressure vessel into the sub-chambers 414. Within each sub-chamber, an inlet space 418 and an outlet space 420 may be provided. The inlet spaces 418 coupled to an inlet manifold 430. The outlet spaces 420 are coupled to an outlet manifold 432. The inlet manifold 430 is fluidically coupled to the pump 310.

A brine tank 440 having a top portion 442 and a bottom portion 444 may be fluidically coupled between the input manifold 430 and the outlet manifold 432. The top portion 442 and the bottom portion 444 are determined relative to the earth. The brine tank 440 may include an upper flow distribution plate 446 near top portion 442 and a lower flow distribution plate 448 near bottom portion 444. The upper flow distribution plate 446 and the lower flow distribution plate 448 act in a similar manner to flow distribution plate 170 of FIG. 8 to reduce turbulence and mixing. A brine feed pipe 450 extends from the top portion 442 of the brine tank 440. Preferably, the brine feed pipe 450 is positioned between the top of the tank and the flow distribution plate 446. Brine fluid from the brine tank 440 is fluidically coupled to the input manifold 430 through the brine pipe 450.

A brine input pipe 452 that is fluidically coupled to the outlet manifold 432 and brine tank 440 receives brine from the outlet manifold 432. The brine inlet pipe 452 may be positioned between the bottom 444 of the brine tank 440 and the flow distribution plate 448. A booster pump 460 driven by motor 462 may be used to pump the concentrated brine fluid from the outlet manifold 432 into the brine tank 440. The booster pump 460 maintains a continuous loop of concentrated brine from the outlet manifold 432 through the brine tank inlet pipe 452 through brine tank 440 and through the brine fluid feed pipe 450 into the inlet manifold 430.

The high-pressure pump 310 pressurizes fluid from the fluid reservoir 114 to the desired pressure to produce a desired amount of permeate that exists the pressure vessel 410. The flow signal from the flow meter 320 provides feedback to the variable frequency device 314 which in turn adjusts the speed of the motor 312 driving the pump 310. The amount of permeate production is adjusted by controlling the motor 312 as measured by the flow signal.

The flow distribution plates 446 and 448 allow non-turbulent entry of flow into and out of the brine tank 440 to maintain a favorable concentration gradient in the brine tank 440. Relatively dense brine is positioned at the bottom of a tank and lighter, less concentrated brine is positioned at the top of the tank 440. The flow distribution plates 446, 448 prevent or reduce mixing so that stratified brine concentrations are formed with the brine tank 440.

In operation, the brine tank 440 is filled with salt water at the beginning of the charge cycle. The brine tank 440 is opened by opening check valve 324 and valve 132. Upon filling, the check valve 324 is closed and the feed pump 310 begins to circulate fluid to each of the membrane chambers 414a-3. Permeate is formed through the permeate outlet 140. Brine is collected in the outlet manifold 432 where it is re-circulated using pump 460 into the lower or bottom end of the brine tank 444. The dense brine 444 pushes the salt water which is less dense up through the outlet pipe 450 to the inlet manifold 430. The process continues until an amount of permeate or a particular concentration of brine is achieved. The system may also include a small reservoir 240 that acts in a similar manner to that described above in FIG. 10.

During the recharge cycle, the pumps 310 and 460 are stopped which lowers the pressure in the system. Valve 132 opens and the pressure in brine tank 440 is reduced. This causes the pressure to be reduced in the brine tank 440. The check valve 324 opens and fresh seawater enters the brine tank 440. The check valve 324 and valve 132 are closed at the start of the next permeate production cycle.

Figure 12:
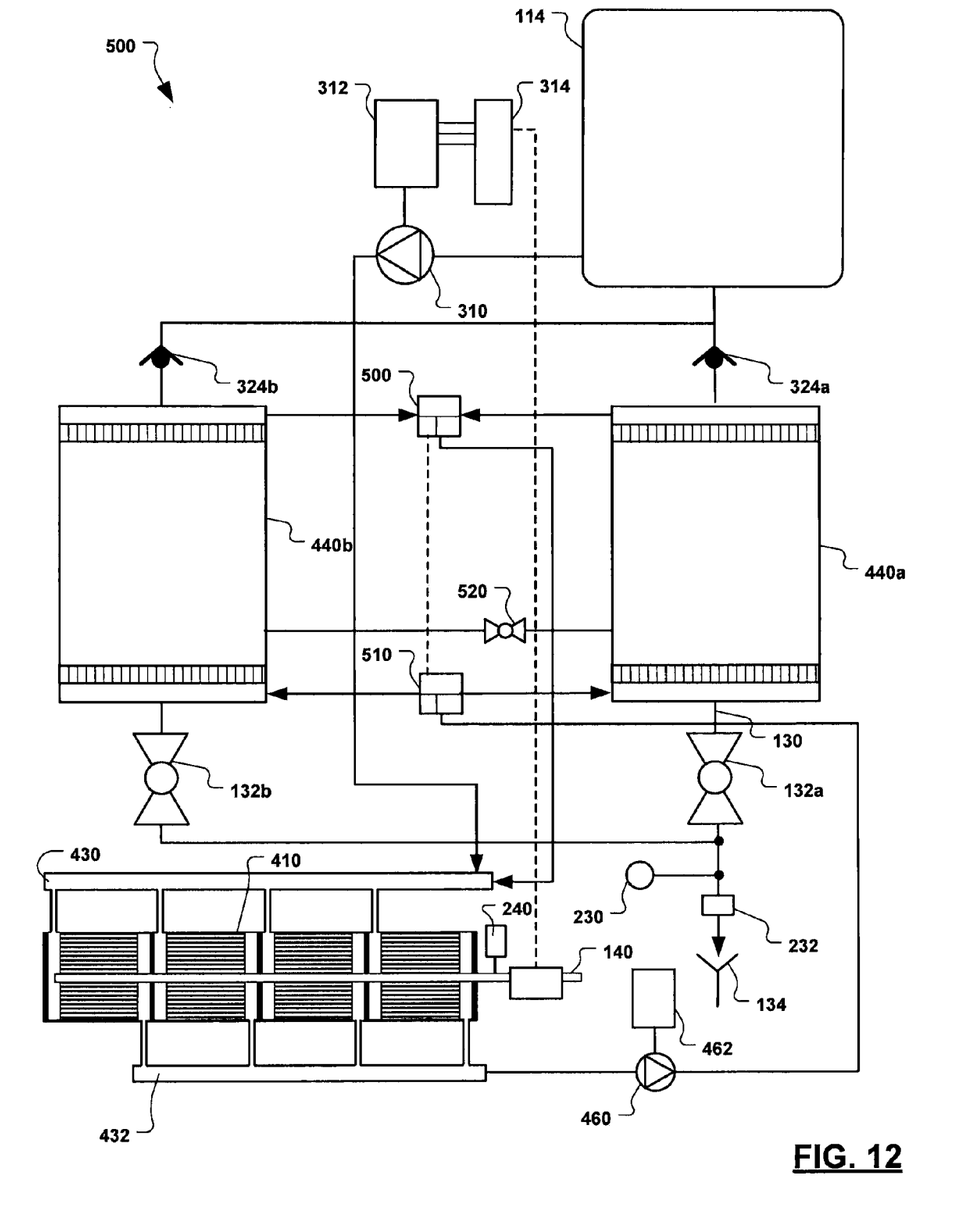
FIG. 12 is a schematic view of a fifth embodiment of a dual brine tank system according to the present disclosure.

Referring now to FIG. 12, an embodiment of a reverse osmosis system 500 using two brine tanks 440a and 440b is illustrated. Common elements from the embodiment of FIG. 11 are given the same reference numerals. In the embodiment of FIG. 11, the system is down for recharging of the brine tank 440. In the embodiment in FIG. 12, the permeate flow is not required to be interrupted while waiting for a brine tank to be recharged with new feed. In this embodiment, the pressure vessel 430 is supplied with high-pressure feed from the brine tank 440a through the inlet manifold 430 and a three-way valve 500. The three-way valve 500 is positioned between the top of the brine tanks 440a and 440b. Re-circulated brine exits through the outlet manifold 432 through pump 460 and back into either one of the brine tanks 440a or 440b through a second three-way valve 510. The high-pressure pump 310 provides high pressure fluid from the feed reservoir 114 into the inlet manifold 430 as in the previous embodiment of FIG. 11. The three-way valves allow the first brine tank 440a or the second brine tank 440b to be used during batch processing. When one tank is off-line, the other tank is on-line. Each system operates in a similar manner to that described above in FIG. 11. At the end of a batch (permeate production cycle), the valve 132b associated with the brine tank 440b may be already in the closed position and check valve 324b prevents flow back toward the reservoir 114. An equalization valve 520 that is fluidically coupled between the tanks 440a and 440b is slowly opened to bring the brine tanks 440a and 440b to the same pressure. The three-way valves 500 and 510 are operated to change the flow direction so that the brine recirculation loop is through the second brine tank 440b. The equalization valve 520 is closed thereafter. The process then continues using the second brine tank 440b in the loop.

After the loop is started using the brine from the second brine tank 400b, equalization valve 202 is closed. The drain valve 132a under the first tank is open and permits brine to pass through to the drain 134. Gravity allows feed from the reservoir 114 to flow into the brine tank 440a. Once the tank 440b reaches maximum salinity or the desired amount of permeate is produced from a tank, the process is switched to provide brine from the tank 440a.

The system then continually repeats. By using a centrifugal pump 310, the pump is always discharging at high pressure alternatively into one of the brine tanks. The membrane array is continuously pressurized which eliminates significant mechanical movement and stress during pressurization and depressurization required in FIG. 11. A number of independent arrays, each equipped with its own brine circulating pump 460, may be operated in a continuous mode using one or more high-pressure batch tanks than the number of independent arrays. The valves may thus be provided in a similar arrangement. It should also be noted that the three-way valves and the pressure equalization valve may be provided in a single unit.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A reverse osmosis system comprising:
a fluid reservoir having feed fluid therein;
a valve disposed between the fluid reservoir and a brine feed tank;
said brine feed tank in fluid communication with the fluid reservoir through the valve that is open during a recharge cycle and closed during a permeate production cycle, said brine feed tank having brine feed fluid therein, said brine feed tank comprising an upper flow distribution plate and a lower flow distribution plate, said brine feed tank in fluid communication with an inlet to a pressure vessel above the upper flow distribution plate, an outlet of the pressure vessel in fluid communication with the brine feed tank below the lower flow distribution plate;
a high pressure pump;
said pressure vessel in fluid communication with the fluid reservoir through the high pressure pump, said pressure vessel comprising a permeate outlet and a reverse osmosis membrane, said pressure vessel having a brine outlet;
said brine feed tank in fluid communication with the pressure vessel;
during the permeate production cycle, said high pressure pump pumping additional feed fluid under high pressure from the fluid reservoir into the pressure vessel, said pressure vessel communicating brine fluid from the brine outlet into the brine feed tank, said brine feed tank communicating brine feed fluid into an inlet of the pressure vessel;
said high pressure pump raising a pressure in the pressure vessel until an amount of permeate is produced from a permeate output of the pressure vessel.

2. A system as recited in claim 1 further comprising a booster pump pumping brine fluid from the pressure vessel to the brine feed tank during the permeate production cycle.

3. A system as recited in claim 1 wherein the pressure vessel comprises a plurality of sub-chambers in communication with an inlet manifold and an outlet manifold, said plurality of sub-chambers each comprises a membrane therein.

4. A system as recited in claim 1 wherein the valve comprises a check valve.

5. A system as recited in claim 1 further comprising a drain valve in fluid communication with a bottom of the brine feed tank that opens during a recharge cycle.

6. A system as recited in claim 1 wherein the brine feed tank comprises a top and a bottom, said top in fluid communication with an inlet to the pressure vessel and said bottom in fluid communication with an outlet of the pressure vessel.

7. A system as recited in claim 1 further comprising a flow meter in communication with the permeate outlet generating a flow meter signal, wherein the high pressure pump comprises a centrifugal pump controlled in response to the flow meter signal.

8. A reverse osmosis system comprising:
a fluid reservoir having feed fluid therein;
a first input valve;
a second input valve;
a first brine feed tank in fluid communication with the fluid reservoir through the first input valve, said first brine feed tank comprises an upper flow distribution plate and a lower flow distribution plate, said first brine feed tank in fluid communication with an inlet to a pressure vessel above the upper flow distribution plate, said brine outlet of the pressure vessel in fluid communication with the brine feed tank below the lower flow distribution plate;
a second brine feed tank in fluid communication with the fluid reservoir through the second input valve;
said first brine feed tank and said second brine feed tank having brine feed fluid therein;
said high pressure pump;
a pressure vessel in fluid communication with the fluid reservoir through the high pressure pump, said pressure vessel comprising a permeate outlet and a reverse osmosis membrane, said pressure vessel having a brine outlet;
said first brine feed tank and said second brine feed tank in fluid communication with the pressure vessel;
during a first permeate production cycle, said first brine feed tank providing brine fluid to the pressure vessel and said high pressure pump pumping additional feed fluid under high pressure from the fluid reservoir into the pressure vessel, said pressure vessel communicating brine fluid into the first brine feed tank or the second brine feed tank;
said high pressure pump raising a pressure in the pressure vessel until a first amount of permeate is produced from a permeate output of the pressure vessel;
during a second permeate production cycle, said second brine feed tank providing brine fluid to the pressure vessel and said high pressure pump pumping additional feed fluid under high pressure from the fluid reservoir into the pressure vessel, said pressure vessel communicating brine fluid into the first brine feed tank or the second brine feed tank;
said high pressure pump raising the pressure in the pressure vessel until a second amount of permeate is produced from the permeate output of the pressure vessel.

9. A system as recited in claim 8 further comprising an equalization valve selectively equalizing pressure in the first brine feed tank and the second brine feed tank.

10. A system as recited in claim 8 further comprising a first three-way valve in communication with the first brine feed tank, the second brine feed tank and a pressure vessel inlet.

11. A system as recited in claim 10 further comprising a second three-way valve in communication with the first brine feed tank, the second brine feed tank and a pressure vessel outlet.

12. A system as recited in claim 11 further comprising a booster pump pumping brine fluid from the pressure vessel to the second three way valve.

13. A system as recited in claim 11 wherein the first brine feed tank comprises a top and a bottom, said top in fluid communication with an inlet to the pressure vessel through the first three-way valve and said bottom in fluid communication with an outlet of the pressure vessel through the second three-way valve.

14. A system as recited in claim 13 wherein the first input valve comprises a first check valve and the second input valve comprises a second check valve.

15. A system as recited in claim 8 wherein the pressure vessel comprises a plurality of sub-chambers in communication with an inlet manifold and an outlet manifold, each of the plurality of sub-chambers has a membrane therein.

16. A system as recited in claim 14 wherein said first brine feed tank is in fluid communication with the first check valve above the upper flow distribution plate, said brine outlet of the pressure vessel in fluid communication with the first brine feed tank below the lower flow distribution plate through the second three-way valve.

17. A system as recited in claim 8 further comprising a first drain valve in fluid communication with a bottom of the first brine feed tank that opens during a recharge cycle.

18. A system as recited in claim 8 further comprising a flow meter in communication with the permeate outlet generating a flow meter signal, wherein the high pressure pump comprises a centrifugal pump controlled in response to the flow meter signal.

\* \* \* \* \*